United States Statutory Invention Registration [19]

[11] Reg. Number: H896

Szakasits et al. [43] Published: Mar. 5, 1991

[54] SEPARATING COLUMN FOR GAS CHROMATOGRAPHY

[75] Inventors: Julius J. Szakasits; Robert E. Robinson, both of Houston, Tex.

[73] Assignee: Shell Oil Company, Houston, Tex.

[21] Appl. No.: 52,170

[22] Filed: May 19, 1987

Related U.S. Application Data

[63] Continuation of Ser. No. 602,626, Apr. 23, 1984, abandoned, which is a continuation of Ser. No. 499,123, May 31, 1983, abandoned.

[51] Int. Cl.[5] ..... B01D 15/08

[52] U.S. Cl. ..... 210/198.2; 55/67; 55/75; 55/386; 55/389; 210/656

[58] Field of Search ..... 55/67, 75, 386, 389; 210/656, 198.2

[56] References Cited

U.S. PATENT DOCUMENTS

| | | | |
|---|---|---|---|
| 2,920,478 | 1/1960 | Golay | 55/67 |
| 3,005,514 | 10/1961 | Cole | 55/386 |
| 3,030,798 | 4/1962 | Lichtenfels | 55/67 |
| 3,116,161 | 12/1963 | Purnell | 55/386 |
| 3,263,488 | 8/1966 | Martin | 55/67 |
| 3,295,296 | 1/1967 | Halasz | 55/67 |
| 3,514,925 | 6/1970 | Bossart | 55/386 |
| 3,557,531 | 1/1971 | McKinney | 55/67 |
| 3,656,278 | 4/1972 | Drinkard | 55/67 |
| 3,839,205 | 10/1974 | Okumura | 55/386 |
| 3,922,392 | 11/1975 | Kohlschutter | 55/386 |
| 3,966,609 | 6/1976 | Godbille | 210/198.2 |
| 4,175,037 | 11/1979 | Benny | 55/67 |
| 4,207,188 | 6/1980 | Tsuda | 55/386 |

OTHER PUBLICATIONS

Hawley, The Condensed Chemical Dictionary, Eighth Edition, New York, Van Nostrand, 1971, p. 591.

Snyder, "Introduction to Modern Liquid Chromatography", John Wiley & Sons, Inc., pp. 202–218, 1979.

Mikes, Chromatographic and Allied Methods, Ellis Horwood Limited, 1979, pp. 225 & 226.

*Primary Examiner*—Robert L. Stoll
*Assistant Examiner*—Greg M. Sweet

[57] ABSTRACT

A method of fabricating an elution chromatography separating column from an elongated capillary tube, such column having a layer comprising a plurality of disunited particles of porous solid material disposed on an inner surface of the tube. The method comprises the steps of: preparing a suspension comprising a dispersive liquid and particles of the solid material; filling an elongated capillary tube with prepared suspension; and flowing an inert gas through the tube to dry the tube thereby leaving a layer comprising a plurality of disunited particles of the solid material attached to the inner surface of the tube.

9 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SEPARATING COLUMN FOR GAS CHROMATOGRAPHY

This is a continuation of Ser. No. 602,626, filed Apr. 23, 1984, now abandoned, which is a continuation of application Ser. No. 499,123, filed May 31, 1983, now abandoned.

BACKGROUND OF THE INVENTION

This invention relates generally to separating columns for gas chromatography and, more particularly, to a molecular sieve coated open tubular column for gas chromatography.

SUMMARY OF THE INVENTION

In accordance with the present invention there is provided a method of fabricating an elution chromatography separating column from an elongated capillary tube, such column having a layer comprising a plurality of disunited particles of porous solid material disposed on an inner surface of the tube. The method comprises the steps of: preparing a suspension comprising a dispersive liquid and particles of the solid material; filling an elongated capillary tube with the prepared suspension; and flowing an inert gas through the tube to dry the tube thereby leaving a layer comprising a plurality of disunited particles of the solid material attached to the inner surface of the tube.

In addition, the present invention provides an elution chromatography separating column comprising: an elongated capillary tube; and a layer comprising a plurality of disunited particles of porous solid material disposed on an inner surface of the tube by filling the tube with a suspension comprising a dispersive liquid and particles of the solid material and flowing an inert gas through the tube to dry the tube thereby leaving a layer comprising a plurality of disunited particles of the solid material attached to the inner surface of the tube.

In the preferred embodiment of the present invention, finely ground 13× molecular sieve is combined with water to form a slurry which is pressured through a clean length of stainless steel capillary tubing. A purge is maintained to dry the column, thereby leaving the 13× sieve particles attached to the wall of the tubing. The layer of finely divided particles provides a high resolution, type separation of naphthenes, isoparaffins and paraffins boiling up to 255° C. However, in other embodiments other finely ground adsorption agents, such as carbon black and firebrick, can also be used, and the capillary tube can be made of other materials, for example, nickel, fused silica, borosilicate and soda lime glass.

Other objectives, advantages and applications of the present invention will be made apparent by the following detailed description of the preferred embodiments of the present invention.

DETAILED DESCRIPTION OF THE PREFERRED EMBODIMENTS

Figure 1:
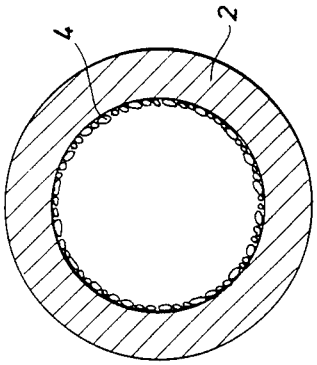
FIG. 1 is a cross section through an elution chromatography separating column according to the present invention.

Suspension of the solid particles in the liquid can be achieved by means of stirring or vibrating the slurry. Usually, a treatment of two to three minutes is sufficient if not additional comminution of the solid is desired. Before the slurry or suspension is pressed into the capillary tube it is advantageous to pass it through a pressure sieve in order to eliminate coarser agglomerates which could lead to cloggings in the capillary tube. A preferred method of separating the desired sized particles is to allow the larger particles to settle during a predetermined time interval in the range of 30–120 minutes. One half to two thirds of the upper portion of the slurry is then pipetted into a separate container. The finely ground solid particles can be any powdery substance usable as an adsorption agent, for example, carbon black, firebrick, and so forth; however, the preferred embodiment employs molecular sieve type 13×. The capillary is filled by means of a pressure vessel and an inert gas, such as nitrogen, helium, argon and so forth. The pressure to be used depends on the diameter and the length of the capillary and on the viscosity of the suspension; usually the pressure is between 4–12 psig. The capillary tube should be cleansed from impurities by washing it thoroughly, such as by using 0.1–0.3N HCl followed by water which is followed by acetone and finally water again, prior to filling. The purging of the tube is performed by flowing an inert gas, such as helium, through the tube to dry it thereby leaving a layer of material attached to the inner surface or wall of the tube. Usually a purge of 0.1–1 ml./min. is maintained for approximately two to five hours to dry the tube. Next the column is stabilized at 420°–440° C. for about twice as long as the drying period.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Fifteen meters of a stainless steel capillary tube with an inner diameter of 0.5 millimeters were conditions with 8 ml. of 0.1N HCl and washed with water which was followed by acetone and finally water again. Next, 2.14 g. of finely divided 13× molecular sieve were suspended in 50 ml. of deionized $H_2O$ and stirred rapidly. The slurry was allowed to settle for 60 minutes; then 10 ml. of the slurry containing a 1:1000 w. ratio 13×/$H_2O$ were pressed into the capillary tube at a pressure of 6 psig while venting the excess to waste at a rate of 5–7 drops per minute. After the tube had been filled, the gas pressure on the slurry was gradually decreased to obtain a purge of $N_2$ at a rate of 0.5 ml./min. which was maintained on the tube for two hours to dry it. The tube was then conditioned with a stream of He passing through the tube at a rate of 6 ml./min. and at a temperature of 440° C. for five hours. The column produced in this way contains about 1 mg. of 13× molecular sieve material, and the particle size in the column ranges from 0.4–12.0 microns.

EXAMPLE 2

Thirty-eight meters of a stainless steel capillary tube with an inner diameter of 0.38 millimeters were rinsed with 0.3 N HCl and washed with water which was followed by acetone and finally water. Then 5.75 g. of finely ground 13× molecular sieve material were suspended in 250 ml. $H_2O$ by stirring. The slurry was allowed to settle for 60 minutes. then 10 ml. of the slurry were separated and pressed into the capillary tube at a pressure of 11 psig., venting the excess to waste. After the tube had been filled in this manner, a purge of He at a rate of 0.2–0.3 ml./min. for two hours was maintained on the tube. The tube was then conditioned with a stream of He passing through the tube at a rate of 4 ml./min. and at a temperature of 440° C. for six hours. The column produced in this way contains abut 1 mg of 13× molecular sieve material, and the particle size in the column ranges from 0.4–12.0 microns.

Figure 4:
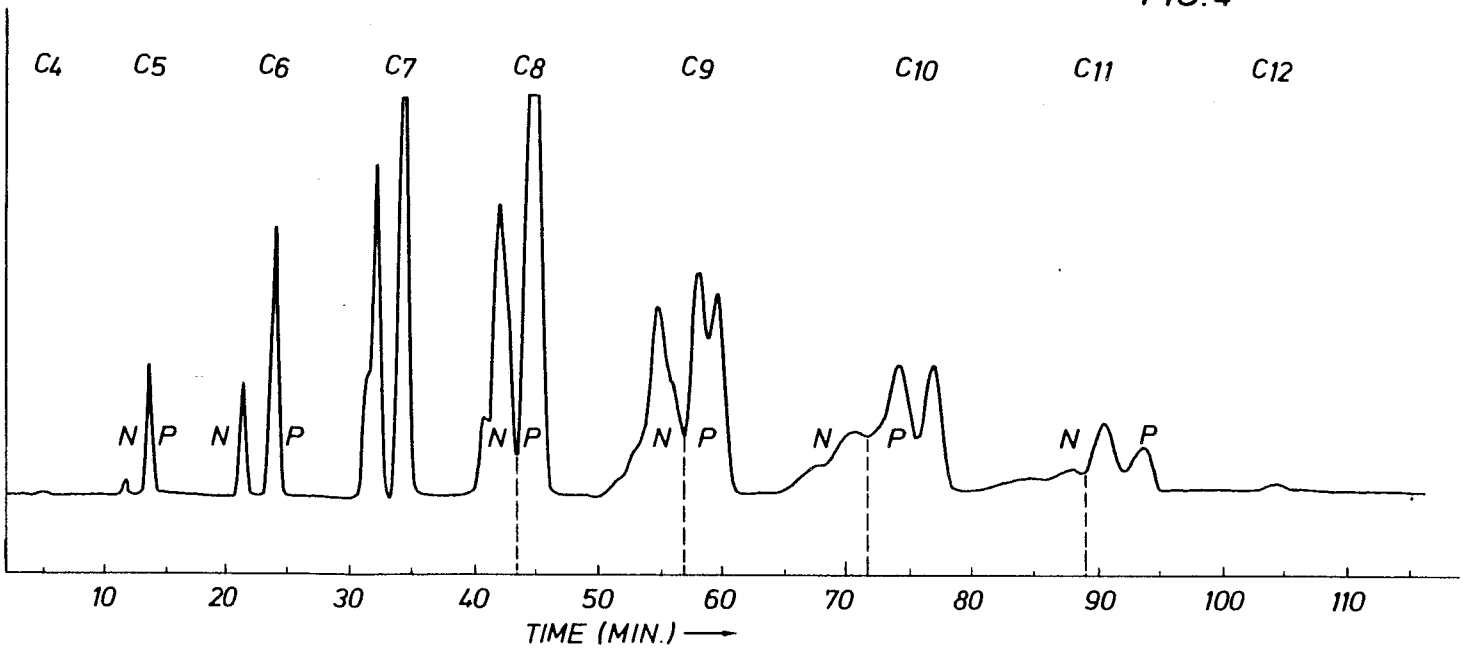
FIG. 4 is a chromatogram obtained with a conventional packed column.

FIG. 1 illustrates a cross section through a stainless steel capillary tube according to the present invention. Stainless steel tubing 2 has a layer 4 consisting of disunited, detached solid residue from a suspension of finely subdivided 13× molecular sieve material in $H_2O$ per Example 1 above. The important improvement achieved by the present invention is demonstrated by FIG. 2 and 3 which illustrate the chromatograms obtained with columns prepared according to Examples 1 and 2 respectively. The temperature program used with each of the columns to obtain the chromatograms in FIGS. 2 and 3 was as follows: the column was maintained at an initial temperature of 100° C. for five minutes; the temperature was then increased at a rate of 10.0° C./min. until 150° C. was reached; the temperature was maintained at 150° C. for one minute; the teperature was then increased at a rate of 2.5° C./min. until 288° C. was reached; the temperature was then increased at a rate of 1.5° C./min. until 440° C. was reached; and the temperature was maintained at 440° C. for forty-two minutes. For purposes of comparison, FIG. 4 illustrates a chromatogram obtained with a conventional 13× molecular sieve packed column which was one meter long and had an inside diameter of 1.27 ; millimeters and which was packed with 13× material having a size in the range of 60 to 80 mesh. The temperature program used with the packed 13× column to obtain the chromatogram in FIG. 4 was as follows: the column was maintained at an initial temperature of 178° C. for five minutes; the temperature was then increased at a rate of 10.0° C./min. until 198° C. was reached; the temperature was then increased at a rate of 4.0° C./min. until 330° C. was reached; the temperature was then increased at a rate of 1.5° C./min. until 390° C. was reached; the temperature was then increased at a rate of 2.0° C./min. until 410° C. was reached; the temperature was then increased at a rate of 2.5° C./min. until 445° C. was reached; and the temperature was maintained at 445° C. for sixteen minutes.

Figure 2:
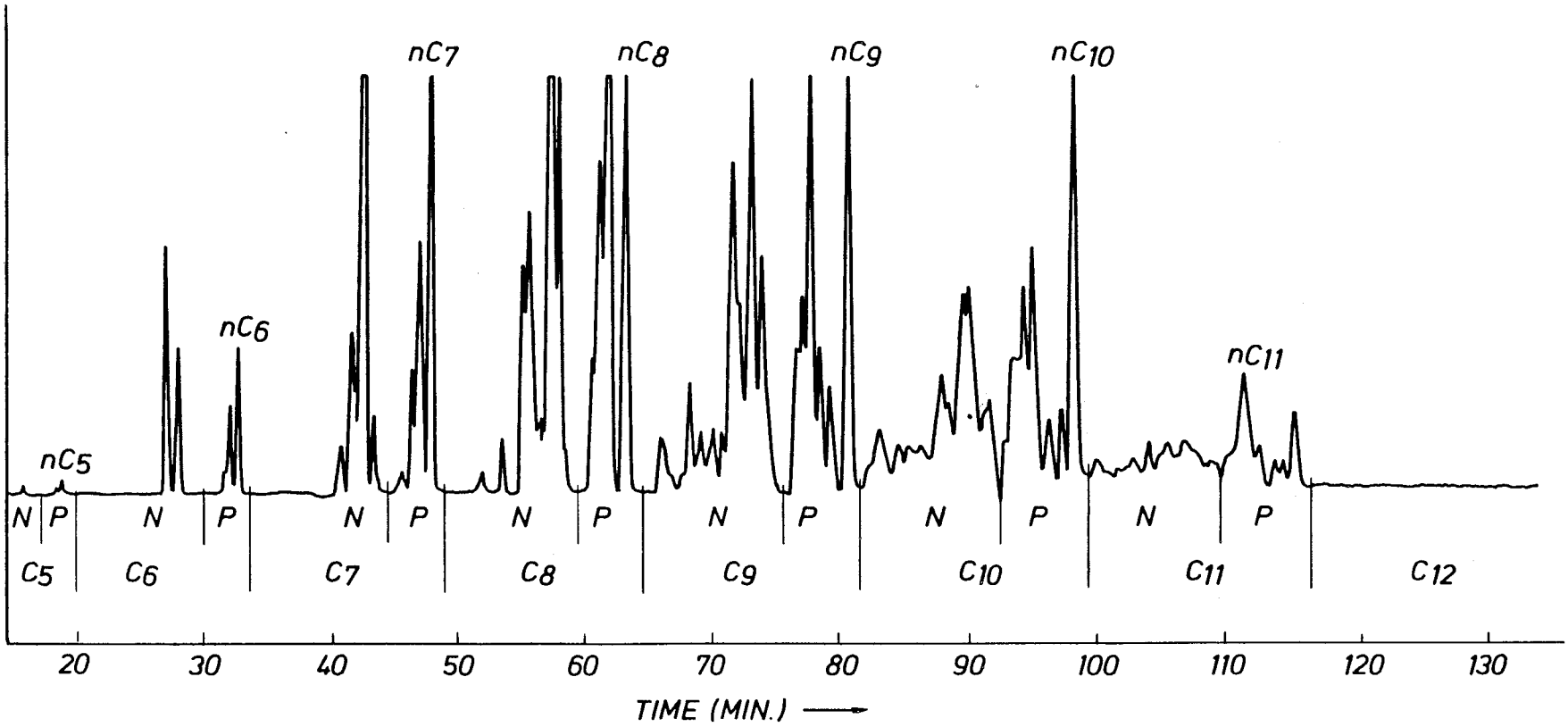
FIG. 2 is a chromatogram obtained with the column of the present invention.
Figure 3:
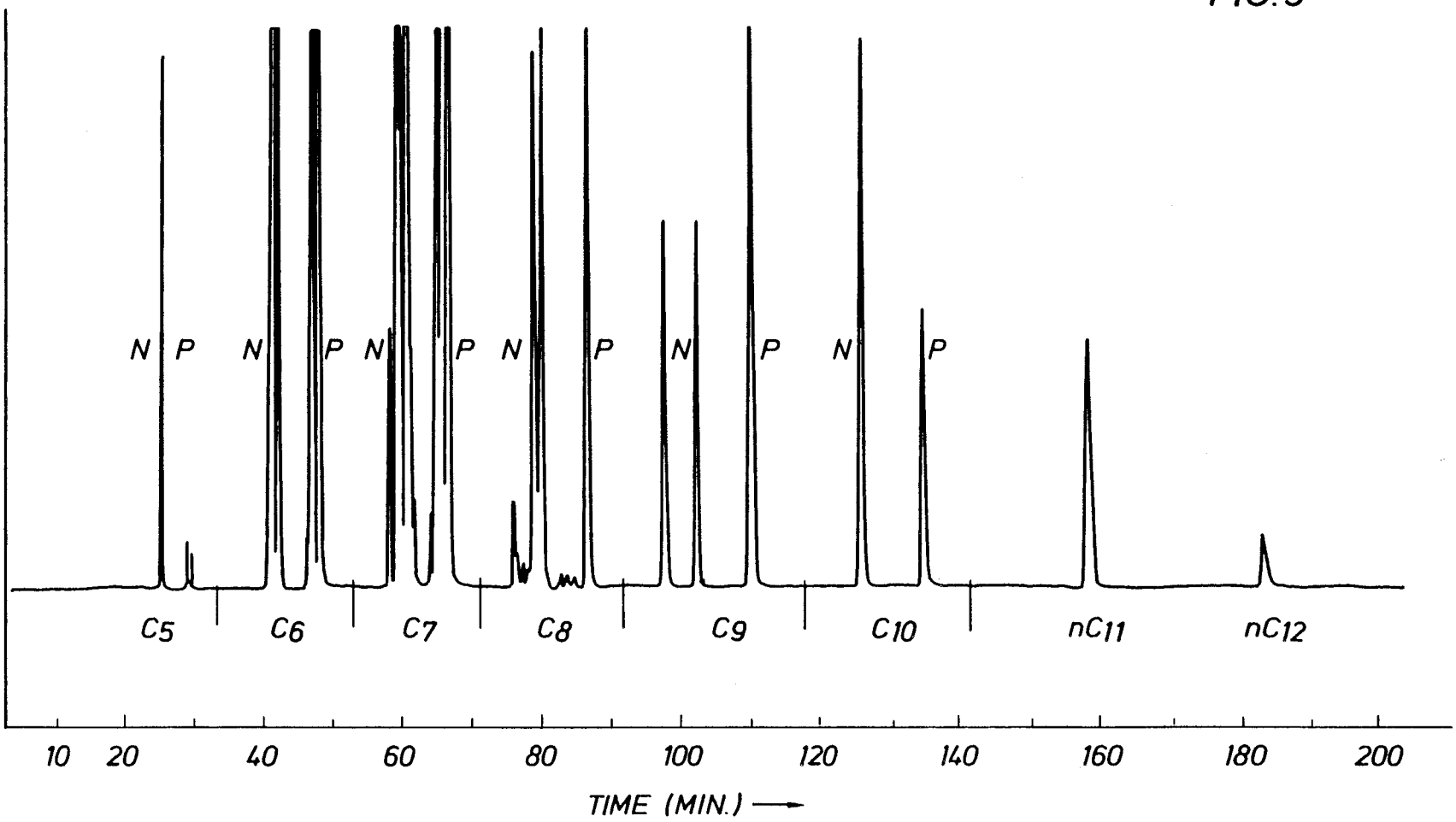
FIG. 3 is a chromatogram obtained with the column of the present invention.

From FIG. 4 it is apparent that the carbon number of separation on a packed column for paraffins/naphthenes is quantitative through $C_8$ partially quantitative for $C_9$ and useful for $C_{10}$. However, for $C_{11}$ and $C_{12}$ saturates fractions there is increasing overlap between the naphthene and paraffin bands that prevents accurate measurement of their relative distribution. Comparing the results obtained with the column of the present invention as invention as illustrated in FIGS. 2 and 3, it is readily apparent that the column of the present invention distinctly separates the isoparaffins and paraffins. Moreover, quantitative measurement of the paraffin/naphthene fractions is carried out with baseline or near-baseline separation throughout the entire sample. A number of individual naphthenes and paraffins of interest can also be identified up to $C_8$. The column of the present invention also provides good peak shape through $C_{14}$ for better integration and quantitative measurement in the $C_9$+ region. In addition, separation of the various hydrocarbon groups is generally carried out at a lower column temperature with the present invention, thus reducing the risk of oxidizing the sample as it is being separated.

What is claimed is:

1. A method of fabricating an elution chromatography separating column from an elongate capillary tube comprising:

preparing a suspension comprising a single component dispersive liquid and particle of porous solid material, filling an elongated capillary tube with the prepared suspension followed by, flowing an inert gas through said tube to evaporate said dispersive liquid and leave a plurality of disunited particles of said porous solid material adhering to the inner surface of the capillary tube, and then flowing an elevated temperature inert gas through the tube to condition the tube and solid material adhering thereto.

2. A method as recited in claim 1, wherein said step of filling an elongated capillary tube with the prepared suspension comprises pushing the suspension into the tube under pressure.

3. A method as recited in claim 1, wherein said solid material comprises 13× molecular sieve material.

4. A method as recited in claim 3, wherein said dispersive liquid is water.

5. A method as recited in claim 2, wherein said solid material is 13× molecular sieve material and said dispersive liquid is water.

6. An elution chromatography separating column comprising:

an elongated capillary tube having an inner surface; and a layer of a plurality of disunited particles of porous solid material attached to the inner surface of said tube by filling said tube with a suspension of a single component dispersive liquid and particles of said solid material, followed by attaching said particles to the inner surface of said tube by flowing an inert gas through said tube to dry said tube, and then flowing an elevated temperature inert gas through said tube to condition said tube and said particles.

7. A column as recited in claim 6, wherein said solid material comprises 13× molecular sieve material.

8. A column as recited in claim 7, wherein said dispersive liquid comprises water.

9. A column as recited in claim 8, wherein said capillary tube is made of stainless steel.

* * * * *